United States Patent [19]

Eibert et al.

[11] Patent Number: 5,109,459
[45] Date of Patent: Apr. 28, 1992

[54] FIBER OPTIC SCANNER

[75] Inventors: Max Eibert, Friedrichshafen; Ulrich Schwanke, Stetten, both of Fed. Rep. of Germany

[73] Assignee: Dornier Luftfahrt GmbH, Oberpfaffenhofen, Fed. Rep. of Germany

[21] Appl. No.: 632,063

[22] Filed: Dec. 21, 1990

[30] Foreign Application Priority Data

Dec. 23, 1989 [DE] Fed. Rep. of Germany ....... 3942771

[51] Int. Cl.$^5$ ............................................. G02B 6/28
[52] U.S. Cl. ............................... 385/115; 250/227.26; 355/1; 358/75
[58] Field of Search ........................ 350/96.24–96.26; 250/227.26; 355/1, 4; 358/75

[56] References Cited

U.S. PATENT DOCUMENTS 4,856,863  8/1989  Sampsell et al. ........... 250/227.26 X Primary Examiner—Akm Ullah
Attorney, Agent, or Firm—R. H. Siegemund

[57] ABSTRACT

A fiber optic scanner includes two fiber bundles, each transforming a linear array into a circular one. The circularly arranged bundle ends cooperate with synchronously rotating deflectors which, in conjunction with single line fiber optics couple a deflector to a light source, provided the linear ends of the two bundles are positioned to be coupled to each other through a field of view.

26 Claims, 3 Drawing Sheets

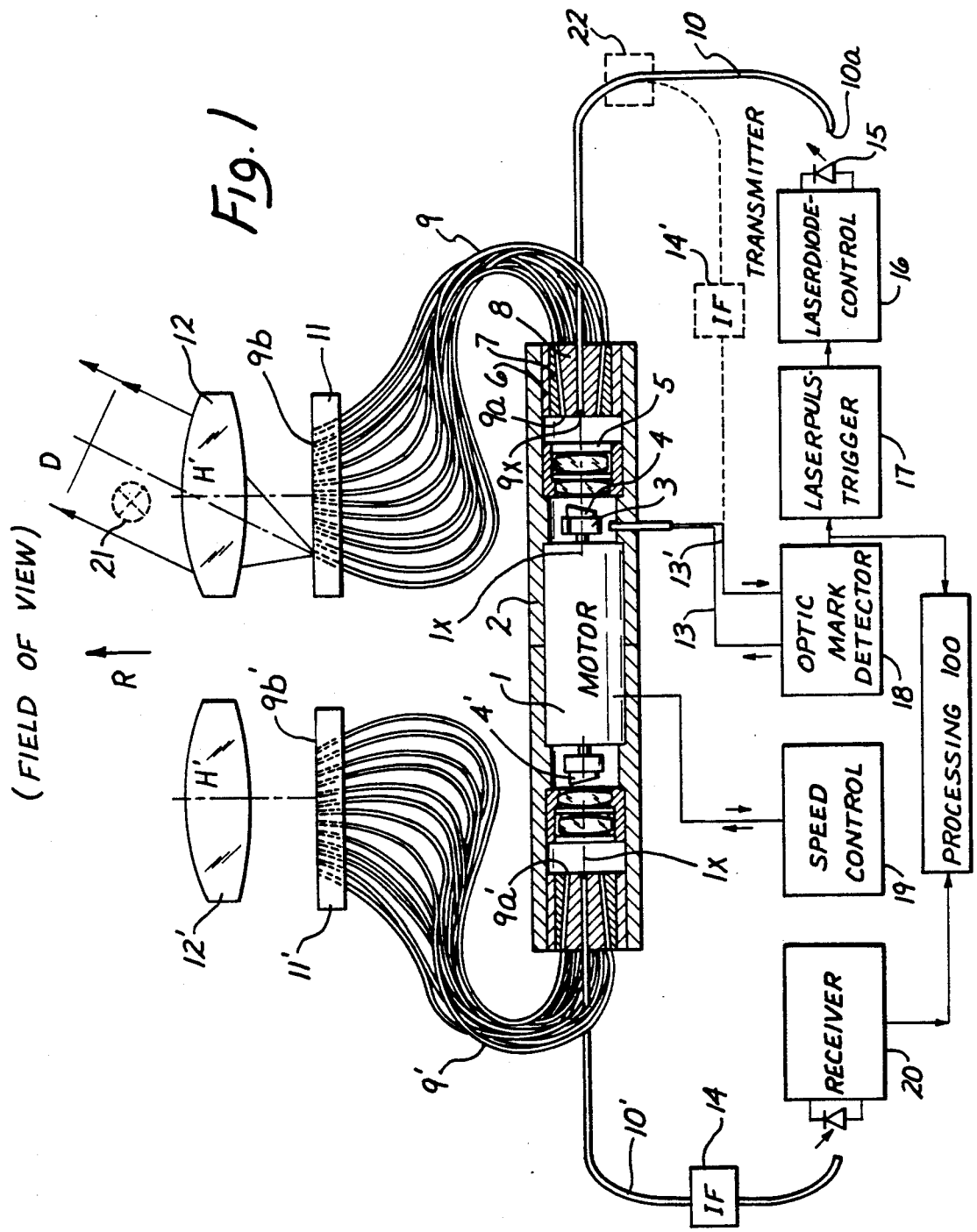

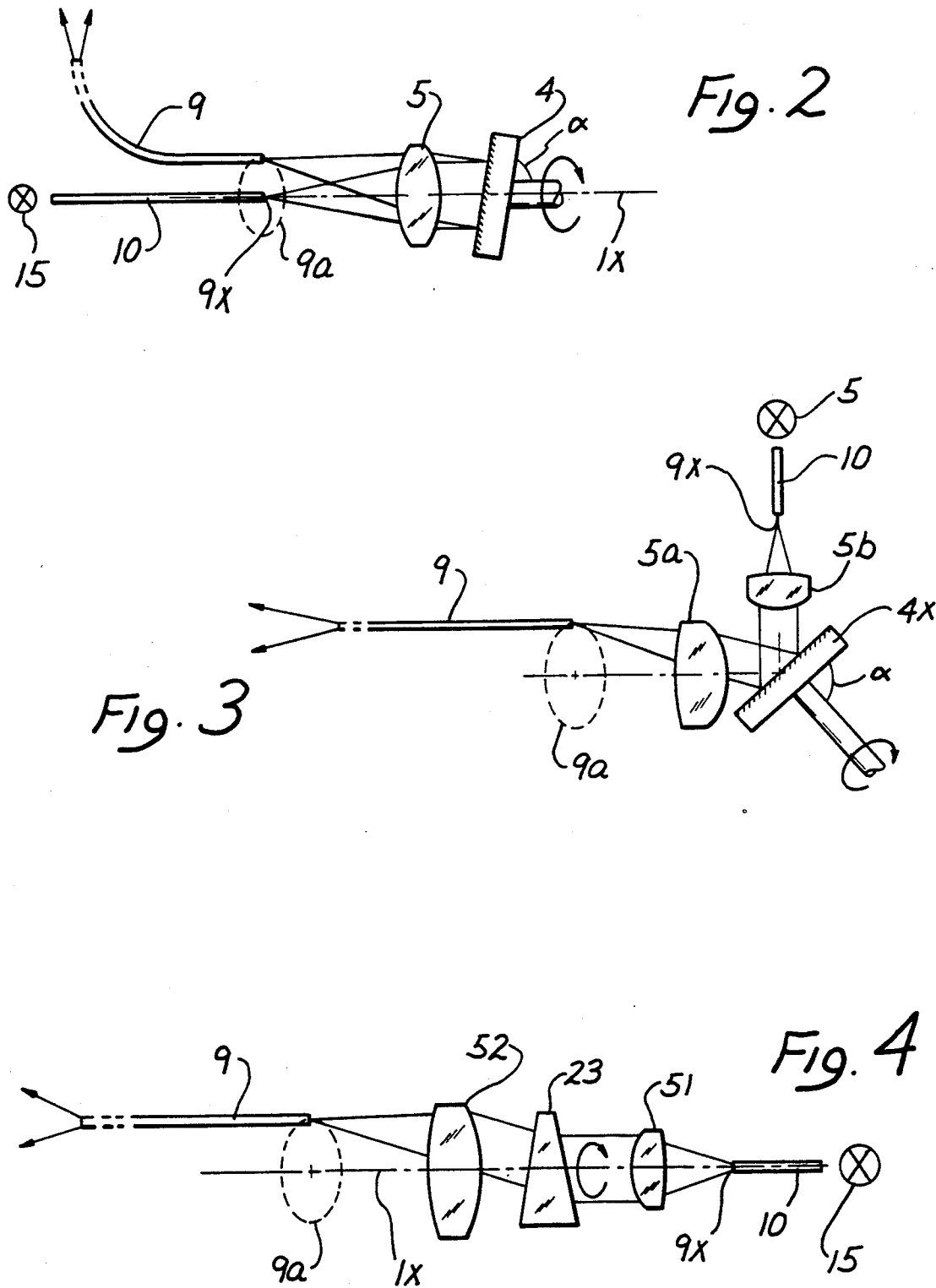

FIBER OPTIC SCANNER

BACKGROUND OF THE INVENTION

The present invention relates to a fiber optic scanner which includes a light source or a receiving diode at one end and a fiber array at the other end.

Fiber optic scanners generally are optical-mechanical devices providing for a deflection of light beams. For example, the light information of one particular line deemed (or, better, made into a) scanning line can be converted or, better channeled into a sequence or series of light pulses for a glass fiber. The scanning proper may be carried out e.g. through a vibrating mirror or a rotating polygonal reflector. Both kinds are mechanical devices and are required to maintain very tight tolerances. It is usually inevitable in mechanically moved parts the mechanical motion as such poses certain limitations including e.g. imaging and scanning speed. Further to the state of the art, see German printed patent applications 33 32 402 and 37 02 330 and British patents 21 10 829 and 21 44 873.

DESCRIPTION OF THE INVENTION

It is an object of the present invention to provide a new and improved fast working mechanically operable fiber optical scanner.

It is therefore a specific object of the present invention to provide a fiber optic scanner having on one end a light source and a glass fiber array at the other end such as the output or having a glass fiber array at an end with a receiver diode at the other end as output.

It is a specific object of the present invention to provide a new and improved optical scanner which utilizes a light source and a rotational reflector cooperating with a circular array of optical fiber ends.

In accordance with the preferred embodiment of the invention it is suggested to provide two glass fiber bundles each of them having one end arranged in a circle while the other end is held in accordance with the desired scanning geometry e.g. a line. The circularly arranged fiber ends in each instance cooperate with a tilted or off center, rotatable reflector or light deflector which provides for reflection of light to or from points in the respective circle, from or to a point on the axis of rotation. By means of an additional fiber optics light is placed into that point of one of the devices, on an axis of rotation of the respective rotating device while in the respective other device the light is taken off that point on the axis of rotation; in the latter instance the light is guided to a receiver and the former instance the light is produced by a light source. The rotating devices are rotated in unison i.e. in synchronism.

From a more general point of view, there are two fiber bundles constructed as circle-to-linear (or vice versa) array converters or transformers, and one of two rotating optical deflection structures, in conjunction with a fiber optic, couples a light source to one of the circles; the other, also in conjunction with a fiber optic, couples the other circle to the light detector. The axes of rotation may run through the respective centers of the circles of the respective fiber optic ends also on the respective axis. However, the deflection angle may be such that an axis of rotation intersects an optical axis that runs through the center of the respective circle.

The rotating element may be either a tilted mirror, a mangin mirror or a concave mirror. Alternatively a wedge prism or a fiber optic with a center-to-off center position can be used. There may be provided appropriate facilities for synchronizing the rotation of the scaning process. It has to be mentioned that in comparison with vibrating mirrors or oscillating polygons, the inventive scanner is highly compact and varies only linearly with the radiation aperture to be covered. There is hardly any other limitation on the aperture except practical limitations and the structure as will be shown is of modular design so that various different scanning geometries can be simply accommodated in the exchange on plug in of different modules.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates generally a fiber optical scanner for the input and output of light; and FIGS. 2-7 illustrate different constructions of certain detail aspects in the arrangement of FIG. 1.

Proceeding now to the detailed description of the drawings, FIG. 1 illustrates a fiber optic scanner which is as such constructed for input electric optical input-/output. The device is symmetrically arranged and has at the left hand portion of the figure the receiving part while the right hand portion shows the transmitting part. The principal light source used is a laser diode 15. The light emitted by the diode 15 enters the entrance window 10a of a glass fiber optic 10 being arranged to run light into the optical axis 1x of the fiber optical scanner on the transmitter side.

Figure 5:
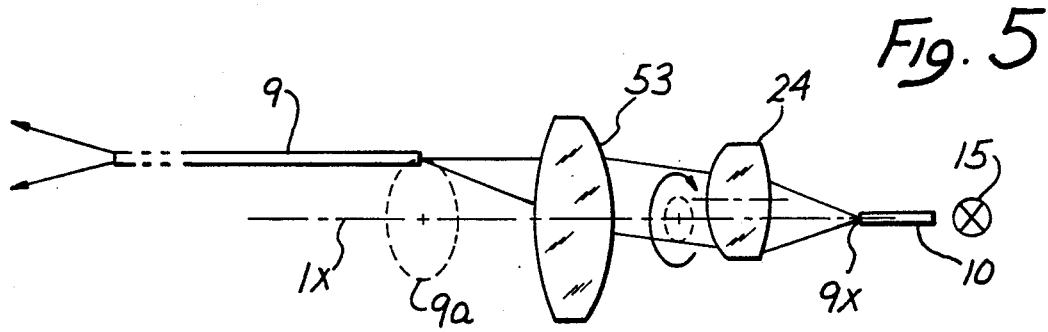

The end of optic 10 that runs the transmitted light into the axis 1x is situated in a point 9x. The light which emerges from the 10 at point 9x is received imaged and collimated by an optic or objective lens system 5. Following reflection of the light by a mirror 4 being tilted in relation to that optical axis being also an axis of rotation 1x, the light is in fact collimated again through the same objective 5 and coupled into one glass fiber end of a circularly arranged glass fiber array 9 of fiber ends. The circular shape is obtained through the fitting element 6,7,8 arranged and being of axial symmetrical contour.

The ends of the glass fiber array and bundle 9 define a circle 9a in a plane that extends perpendicularly to the plane of the drawing. Reference numeral 9x denotes also the center of that circle being situated on the axis 1x of rotation of the mirror 4. Reference numeral 1 refers to a drive or motor which drives mirror mount 3 from the mirror 4. On account of tilt of mirror 4 the light that comes from the optic 10 in point 9x, and as centrally directed by optic 5 onto that mirror 4, will now be deflected, and after recollimation by optic 5 will reach one of the fiber ends on circle 9a. As the mirror 4 rotates, light is directed in this fashion into one after another of the circularly arranged inputs for the glass fiber bundle 9, in the circle 9a.

Full symmetry is obtained in that these ends of the glass fiber bundle (circle 9a) as annularly arranged are not only arranged coaxial with respect to the axis 1x but also with respect to the glass fiber 10. The other ends of the glass fibers 9 are held in a fitting 11 on a line 9b; this is the scanning light for the light source. The center of the bundle runs through a particular point H'. The point H' is a main point of the objective lens 12. The fitting 11 holds the exit ends of the glass fibers 9 in line 9b in a focal plane of that objective 12. The arrangement is linear so that in fact a true line scan is made possible.

The arrangement permits with minimal losses in transmission to deflect a collimated beam of any kind of diameter at a high speed and without restrain as to the direction of reflection. All movable parts are small and the beam aperture D is independent from the dimensions of those parts that are actually moving, namely the mirror 4 and the driving equipment (1,3).

If the laser diode 15 is intermittently operated so as to provide a pulsed source synchronization may be desired with regard to the angular or rotational position of the mirror 4 on one hand, and with regard to the specific position of the fibers at the linear array end at the mount 11 on the other hand. For this then one provides for a constant speed motion for the motor, through a rotational speed control circuit 19. The deviation from the required speed may not exceed about a 100 ppm. An optical marking scanner 18 recognizes a position of marks on the mirror mount 3. This recognition is carried out through two fiber optics 13 and 13' of which 13 runs a light signal to the marked periphery of mirror mount 3, and fiber optic 13' signals back when a marking is passed. By way of example, there are as many markings as there are fibers in a bundle 9, so that each pulse is associated with a particular position of tilt mirror 4 such that thereby a particular fiber of the bundle 9 will receive the light from 15-10.

The marking detector 18 controls a laser pulse trigger 17 whose pulses corresponding to the number of glass fibers in the array 9 so as to obtain trigger pulses at a constant frequency. These trigger pulses are effective in the laser diode control circuit 16 to initiate in each instance a pulse that is then transmitted as a light pulse by the laser diode 15.

The trigger pulses on the other hand could be produced by utilization of this entire array in the reverse direction. For this a light source 21 can be placed on the output side of the optic 12 but off the scanning beams. The light path is then run through in the reverse and reference numeral 22 refers to a coupling structure by means of which the light from 9 through 45 and upper part of 10 is coupled off the glass fiber 10 and fed through a amplifier circuit IF14' to the detector 18. This way the detector 18 provides directly the trigger pulses.

Particularly, as to the foregoing the light from source 21 reaches all fiber ends in circle 9a, but only one end at a time will be optically coupled by mirror 4 to the point 9x, and that light is used to trigger the laser diode 15 whose output will then reach that same fiber end on circle 9a, but in the reverse direction as the trigger signal from source 21. In that case then it is not necessary to provide a constant speed ratio 19 for the motor 1 and the laser pulse triggering device 17 can also be omitted; the signal from 14' is passed directly as trigger signal to circuit 16. Thus, here one simply extracts trigger pulses directly in response to the particular angular position of the mirror 4 whenever a light pulse does in fact reach the coupler Y-22. The light for detector 18 which still either comes from the Y-coupling device or a beam divider is passed through filter 14'. In order to avoid back feeding of the pulsed laser diode output as far as the marking detector 18 is concerned. Filter 14' separates particular frequencies in the control circuit from others.

The left hand side of FIG. 1 shows an analogous system with rotatable mirror lens system the mirror 4' being thereof also driven by the motor 1. An array of glass fiber optics 9' with a holder 11' and a lens 12' is provided at the input end; 9'b denotes a line of fiber ends in the imaging plane of lens 12'. Also, there is a spectral filter IF in the particular fiber optic 10' for eliminating optical noise. The filter is of course tightly limited to the laser frequency to make sure that any light that reaches 20 did in fact originate with diode 15.

Most optical components are arranged symmetrically, and at least in terms of function compare directly to the arrangement 9,10,11 etc. outlined above. The array fittings and mounts 11 and 11' are situated vis-a-vis the objectives 12, 12' and in relation to each other such that they have an imaging relationship to the same object field-of-view points in the direction R. Owing to a complete symmetrical arrangement any light beam directed and oriented towards a particular object to be scanned through the right hand side, is monitored by and through the left hand side arranged and owing to the particular optic 12' a particular glass fiber end of the bundle 9' will receive light that was reflected by an object and originated with a particular one of the ends 9a of the fiber bundle 9.

The left hand side of the fiber optic arrangement that is the ends 9'a of bundle 9' are also arranged in a circle 9'a around an axis which is the same axis of rotation and coaxial thereto as one end of the fiber 10' whose output is juxtaposed to a receiver 20.

The filter IF is an interference filter, simply for noise suppression. Otherwise the arrangement is fully symmetrical including the mirror 4' that is rotating in synchronism with mirror 4 on account of the fact that they have common drive shaft.

This illuminating and range finding function should be described in greater detail. Depending on the instantaneous position of the mirror 4, the light spot from 10 (9x) is set into one fiber of bundle 9, and emerges from one point on the linear array 9b (e.g. the leftmost one as shown). This in turn, and through optic 12, results in an illuminating scanning beam. One object point in the field of view will return light, but in a fanned out fashion. Nevertheless, maximum light will reach e.g. the leftmost entrance in line 9'b, but also several others. However, only that light which will reach that one entrance, will when emerging from circle 9a be intercepted by mirror 4', to reach point 9'x and through 10' receiver 20.

FIG. 2 illustrates in greater detail the beam and the fiber optic scanner on the right hand side of FIG. 1. As shown in a more functional and diagramatic fashion, the light source 15 sends light in the optic 10 but is shown here as a straight line. This light is collimated by the lens 5 and is directed towards the mirror 4 having an angle alpha of a few degrees less than 90 degrees in relation to the optical axis 1x. The reflected light will be directed towards one of the fiber optics 9, particular entrance in the circle 9a of fiber ends pertaining to the various fiber optics of the bundle 9 as per FIG. 1.

FIG. 2 illustrates just what was basically shown already in FIG. 1 and that has of course validity in both optical branches of FIG. 1, the right hand transmitter branch and the left hand receiver branch.

FIG. 3 illustrates a modification wherein the optical axis of the scanner and the rotational axis of a mirror 4x intersect. The light source 15 is likewise not directly situated on the optical axis as defined by the fiber optic 10. The light from source 15 is captured by the optics 5b reaches the mirror 4x. This mirror as stated is likewise tilted vis-a-vis the center axis of signals 9a but the axis of rotation 1x is not coaxial thereto through the optic 5a the light reaches the particular circle 9a in the same fashion outlined earlier. It should be noted that the optical relations remain the same as before, essential is that the point 9x where light emerges from the optic 10 is optically projected into the center of the circle 9a.

FIG. 4 illustrates a still further form of practicing the optical input and output sides. A rotating element is provided here, not as a mirror but as a wedge prism 23. The light coming on the optical axis through the fiber optic 10 from the source 15 as before, is directed through an optic 51 onto the wedge prism 23. The wedge prism 23 rotates about axis 1x and that deflects the light beam from fiber optic 10 and through a lens 52 along the optical axis into the circle 9a as outlined and described earlier.

FIG. 5 illustrates a further modification and wherein the rotating element is a lens 24 having an optical axis that is eccentric to the axis of rotation 1x. This is also the input axis of the fiber 10 (point 9x). As the lens 24 rotates about the axis 1x the light from the source 15 through the fiber optic 10 is again arranged to reach the circle 9a. However, the end point 9x of fiber optic 10 is just on axis 1x, not in the center of the fiber 9a. A relatively large aperture, single member optic 53 provides the requisite collimation action.

Figure 6:
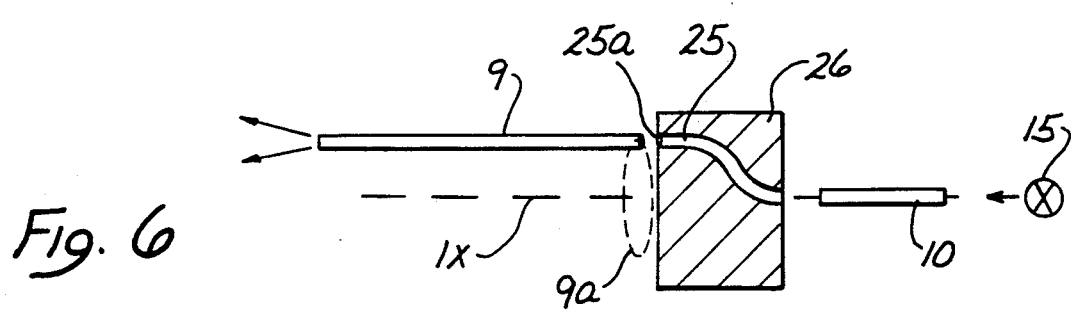

A further embodiment is shown in FIG. 6 wherein a block 26 is a carrier and is used to rotate about the axis 1x and light from the source 15 through the fiber optic 10 is deflected by the curved and bent-up fiber optic 25. Thus, as carrier 26 rotates the end 25a of the fiber optic 25 is juxtaposed to the entrance windows of the fiber optics 9 one after the other i.e. that end of fiber optic 25 describes a circle which is in effect juxtaposed to the circle 9a. There may be an optical system interposed that is not shown. This embodiment is particularly useful for strong light sources.

Figure 7:
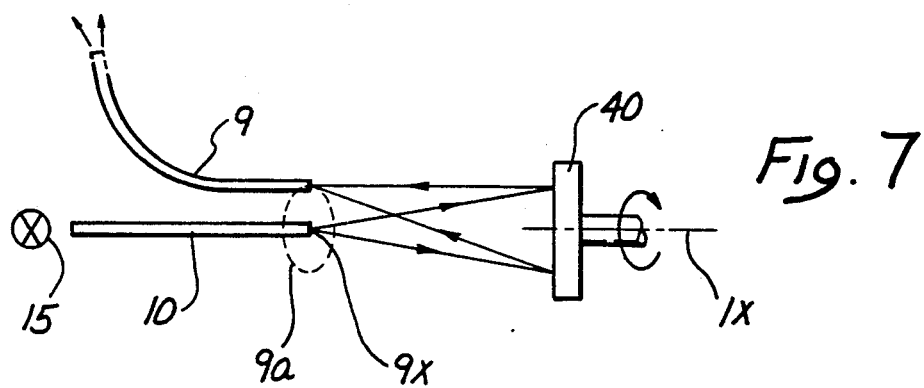

FIG. 7 is a modification of FIG. 2, wherein the lens 5 and the plane mirror 4 are replaced by a concave mirror 40 which images point 9x onto the circle 9a, and progressively as mirror 40 rotates about axis 1x as before.

The various elements shown in various modes of realizations shown in FIGS. 2,3,4–7 are all applicable quite analogously to the left hand side of FIG. 1 simply through duplication.

The inventive fiber optic scanner may be used e.g. for cameras providing range images e.g. for control of robots or for just controlling light pulses. Also encoded data streams can be processed in this fashion.

The light sources 15 may be laser diodes or glass fiber coupled diodes and rather than pulsing the light source one may use CW laser diodes or CW lasers and for these and other continuous working light sources one does not need synchronization, as it is necessary for pulsed diodes or laser diodes. The fiber bundles 9 and 9' are used as a cross sectional converter wherein a circular arrangement of the fiber optic ends which delineate the circle 9a outlined above is transformed into a true line and vice versa. In addition of course there is a transformation of focal plane from that of the circle 9a to that of the line 9b and vice versa. The fiber optics 9 and 9' are made of monofibers with core diameter each of 0.5 mm. Other multimode or monomode fibers in the bundles can be used. The numbers of fibers in this particular example illustrated is 64 which is the equivalent light bytes but the number is only exemplary. The maximum number of fibers is limited by the manufacturing techniques of an array and possibly by the accuracy that can be handled. The kind of fitting 11 and so forth permits a deviation of the position of the glass fibers and a deviation of roundness of not more than 0.005 mm.

The inventive arrangement of course takes advantage of the flexibility of glass fibers. This means that the fibers can be positioned such that any imaging errors in various objectives such as 12 or 12' are also compensated. The glass fibers may be arranged in as stated the respective focal planes of the optics 12, 12', 5 etc. It is further pointed out that a linear arrangement by operation of the holders 11 and 11' is simply a matter of convenience and exemplary since linear scanning i.e. scanning along a straight line is what is usually being practiced but other scanning figures such as spirals or the like can also be used. This is a matter of arranging the fiber ends. The linear arrangement is of course the more practical and common way of handling most situations. Also, it is not necessary in principle that there be a single line but the scanning may involve a relative short two or more lines in parallel or even a two dimensional array. It can be seen that the function of fibers 10 is to run light into and out of the axis of rotation and/or the center of the fiber circles. Here one may replace this fiber by a tapper which in fact runs on the input side several light sources together which in fact provides for an increase in scan frequency as well as in illumination intensity.

The optical element and lens 5 and 5' are arranged and composed of two members and it might be advisable to have their distance adjustable in relation to each other in order to vary the focal length in each instance. This is a convenient tool for compensating assembly and manufacturing tolerances of e.g. the mirror arrangement of the glass fibers ends 9. The mirror 4 if used is preferably configured either as just a planar mirror or as a dielectric selective filter this way it combines the function with an interference filter in e.g. 14 or elsewhere.

In lieu of a planar mirror 4 one could use a concave mirror (FIG. 7) or a mangin mirror so that the functions of a mirror and of the collimating action of lenses are combined. In this case a single member objective may suffice. Another way of providing rotation is the utilization of a rotating diaphragm with an aperture that is eccentrically positioned to the axis of rotation. In fact one can construe FIG. 2 to be a special version of this particular kind of arrangement. As far as the drive motor 1 is concerned a high frequency motor either a synchronous motor or a dc motor can be used with a very accurate bearing and mount and an eccentricity error of less than 0.005 mm and a balancing quality of the glass 0.04. The rotational speed may be in the order of 15 revolutions/minute but motors are known and can be used here which go up to 100,000 rpms and more. On the other hand and depending on the particular employment one could use a step motor in order to provide a step by step scanning from one position to the next one.

The invention is not limited to the embodiments described above but all changes and modifications thereof, not constituting departures from the spirit and scope of the invention, are intended to be included.

We claim:

1. Fiber optical scanner comprising:

a first fiber optic bundle and a second fiber optic bundle, each bundle having one end of its respective fibers arranged in a circle, the respective other ends of the fibers being arranged along a scanning line, there being two scanning lines accordingly;

first and second rotatable light deflecting means providing light deflection respectively as between the circles and respective points in or on an axis through the respective circle;

means for providing common rotation to the first and second light deflecting means;

a light source, and a light detector;

first optic means for coupling the light source to the respective point pertaining to the first light deflecting means, so that upon rotation of the first light deflecting means, light is progressively set from that point and into the circularly arranged ends of the fibers of the first bundle;

second optic means placed on the respective other one of the points and which receives light that is passed from the circularly arranged ends of the second bundle and provided for passing that light to the light detector; and means for positioning the ends of the bundles as arranged in the lines so that light emerging in any instant from one of the ends of the first bundle and being reflected by the ambiance toward the second bundle, will be received by a fiber end of the second bundle such that the received light is passed to the other end pertaining to the respective circle of the second bundle and is reflected in that instant by the rotating second light deflecting means and into the point from which it will be taken by the second optical means from which it will reach the light detector.

2. Scanner as in claim 1, the first and second rotatable light deflecting means being in each instance a rotatable, tilted mirror.

3. Scanner as in claim 2, the mirror being interposed between the respective point and the circle, and the axis through the circle and the respective point deflected by the mirror.

4. Scanner as in claim 2, the point being on an axis through the center of the circle.

5. Scanner as in claim 1, the first and second light deflective means being in each instance a concave mirror with a tilted axis.

6. Scanner as in claim 1, the first and second light deflective means being in each instance a fiber optic with one end positioned on the respective axis of rotation and the other one being adjacent to the respective circle.

7. Scanner as in claim 1, the first and second light deflective means being a lens that is rotating off center with regard to the respective point.

8. Scanner as in claim 1, the first and second light deflective means being in each instance a wedge prism.

9. Scanner as in claim 1, the first and second light deflective means being in each instance a mangin mirror.

10. Scanner as in claim 1, the means for providing common rotation being step motor.

11. Scanner as in claim 1, the first and second optic means being respectively two fiber optic.

12. Scanner as in claim 1, the first and second optic means including in each instance a lens interposed respectively between the first and second deflection means and the respective point.

13. Scanner as in claim 1, the first and second light deflecting means including timing means operating in response to the rotation of the deflecting means for triggering the light source.

14. Scanner as in claim 1, the means for providing common rotation and the first and second deflecting means being coaxial.

15. A fiber optic scanner comprising:

a first and a second fiber optic bundle each having (i) one end arranged in a linear array both facing a field of view, (ii) an opposite end arranged in a circle array, so that the first bundle transforms the circle array into the linear one, and the second bundle transforms the linear array into the circular one;

a light source and a detection;

first optical means including rotating light deflection means for coupling the light source to the circular array of the first bundle, so that the linear array of the first bundle ends provide a linear series of light signals, the first optical means including means having a focal plane in the circular array;

second optical means including a rotating deflection means for coupling light from the circular array of the second bundle to the detection and including means having a focal plane in the circular array of the second bundle; and means for operating the two light deflection means in synchronization so that light from any end of the linear array of the first bundle, as reflected by the field of vision reaches one end of the linear array of the second bundle, whose opposite end of the circular array of the second bundle is coupled to the detector of the deflection means of the second optical means.

16. A scanner as in claim 15, wherein the first and second optical means each include fiber optic means having one end coupled respectively to the light source and the detector, the first optical means further, in conjunction with its rotating deflection, coupling the other end of the fiber optic of the first optical means, to the circular array of the first bundle, the second optical means further in conjunction with its rotating deflector coupling the circular array of the second bundle to the other end of the fiber optic of the second optic means.

17. A scanner as in claim 16, the rotating deflecting means being a tilted mirror.

18. A scanner as in claim 16, the mirror transforming the point into the circle or onto a portion of an axis through the circle.

19. A scanner as in claim 16, the rotating deflecting means being a tilted concave mirror.

20. A scanner as in claim 16, the rotating deflecting means being a wedge prism.

21. A scanner as in claim 16, the rotating deflecting means being a rotating, off center lens.

22. A scanner as in claim 16, the rotating deflectign means being a rotating off center fiber optic.

23. A scanner as in claim 15, the fiber optics having their respective other end located on the respective axis of rotation.

24. A scanner as in claim 23, the other ends being situated in the respective centers of the circular arrays.

25. A scanner as in claim 23, the other ends being situated on the axis of rotation.

26. A scanner as in claim 23, the other ends being situated so that a respective axis through such an end, is deflected by the respective deflector means through the center of the respective circle.

* * * * *